Aug. 15, 1961  A. J. LANGE  2,996,304
WALKING MODEL OF AN AMBULANT ANIMAL
Filed June 30, 1959  4 Sheets-Sheet 1

INVENTOR.
ANDREW J. LANGE
BY P.C. Kuhnert
HIS ATTORNEY

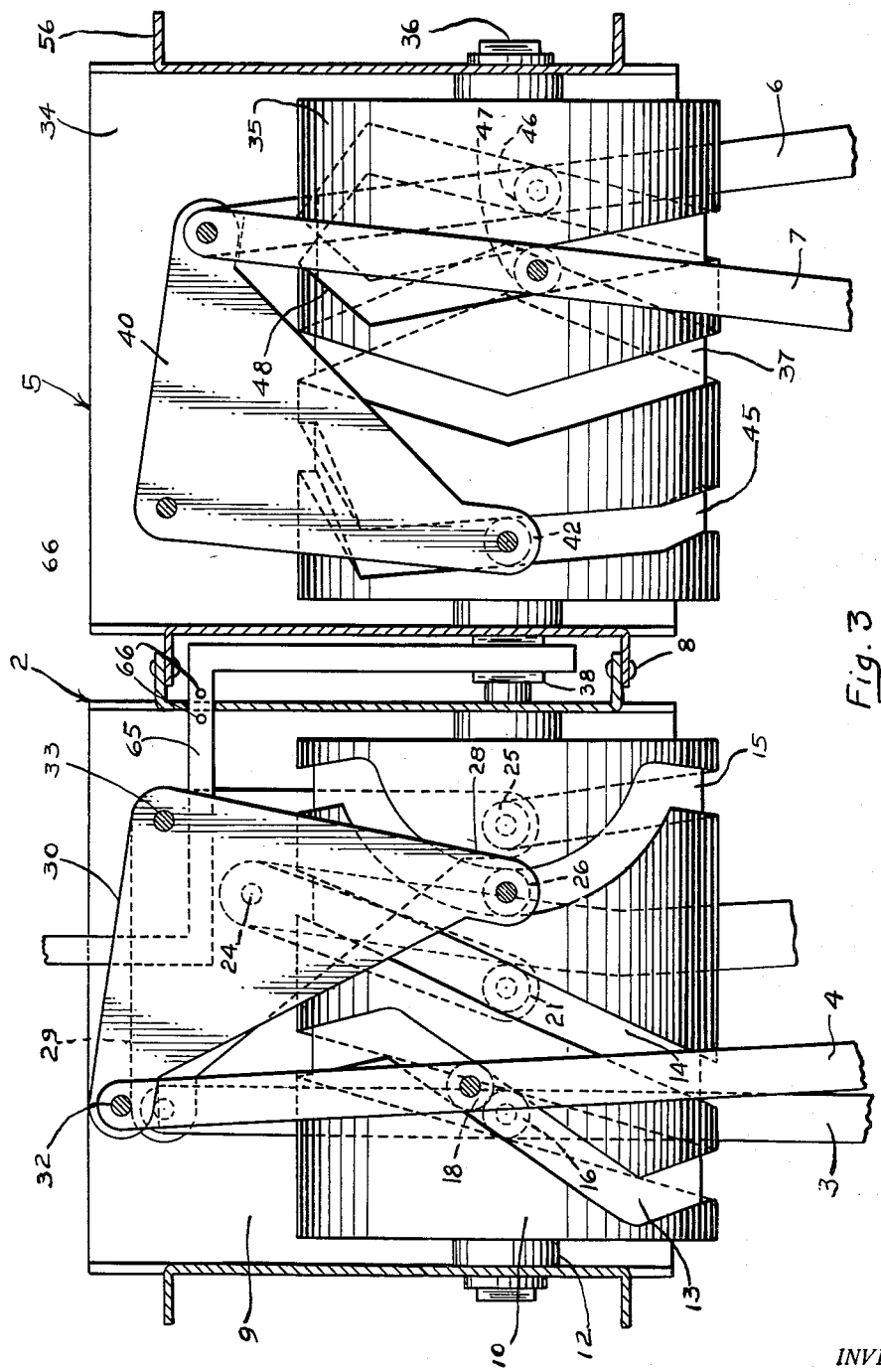

Aug. 15, 1961 A. J. LANGE 2,996,304
WALKING MODEL OF AN AMBULANT ANIMAL
Filed June 30, 1959 4 Sheets-Sheet 3
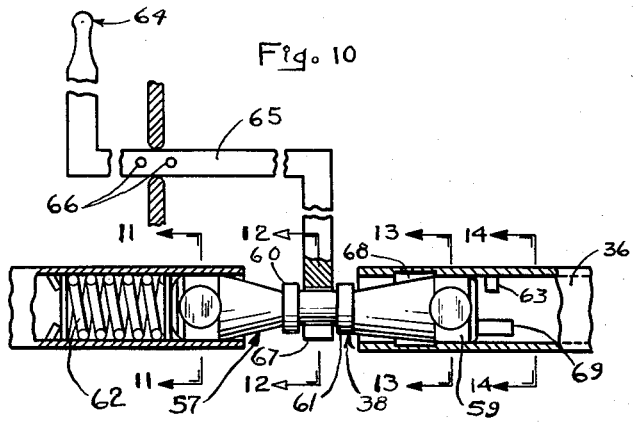
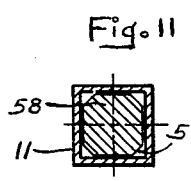 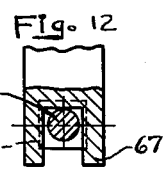 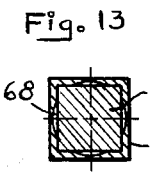 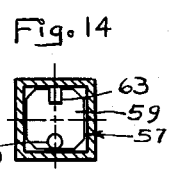
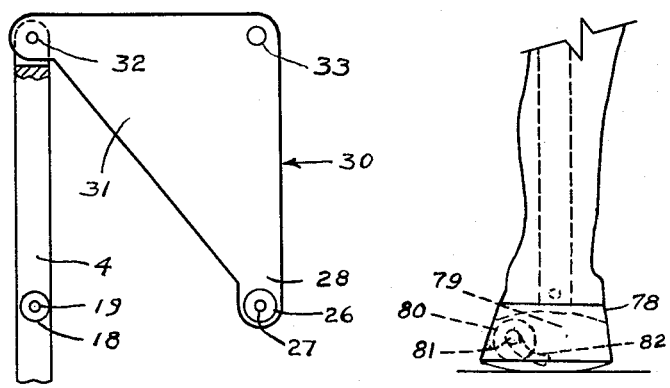
Fig. 4
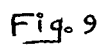
Fig. 9
INVENTOR.
ANDREW J. LANGE
BY PCKuhnert
HIS ATTORNEY Aug. 15, 1961 A. J. LANGE 2,996,304
WALKING MODEL OF AN AMBULANT ANIMAL
Filed June 30, 1959 4 Sheets-Sheet 4
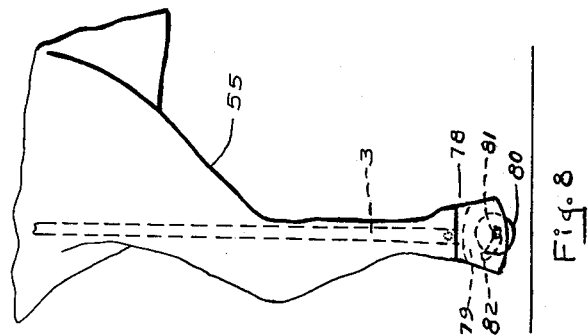
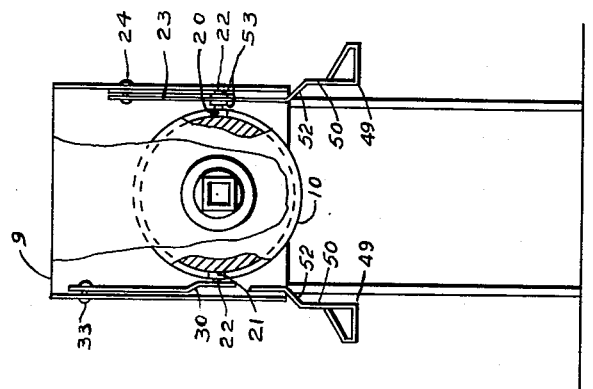
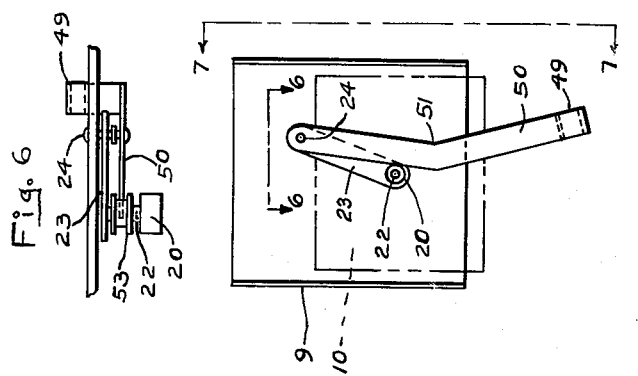
INVENTOR.
ANDREW J. LANGE
BY
HIS ATTORNEY United States Patent Office 2,996,304
Patented Aug. 15, 1961

2,996,304
WALKING MODEL OF AN AMBULANT ANIMAL
Andrew J. Lange, Swissvale, Pa.
(571 Greendale Ave., Edgewood, Pittsburgh 18, Pa.)
Filed June 30, 1959, Ser. No. 823,943
14 Claims. (Cl. 280—1.181)

This invention relates to an ambulant model of a walking animal and in particular to a model which simulates the walking action of a four-legged, or two-legged animal, as the case may be, while propelling itself or being propelled.

The principal object of this invention is to provide a model of a walking four-legged animal, such as a horse, which approximates the size and walking action of such an animal.

Another object of the invention is to provide an ambulant model of a walking animal which can be straddled and ridden while the model is propelling itself and rider.

Another object of the invention is to provide an ambulant model of a walking animal which will effect the aforesaid simulated walking action when being led or pushed by hand, actuated by propelling action of the rider, or propelled by a motor supplied with an extraneous source of power.

Another object is to provide an ambulant model of a four-legged animal of the above type which can be made to turn to the right or left through the manipulation of reins, or the like, by the rider or leader.

A further object of the invention is to provide a walking four-legged animal model of the above type which may be quickly and readily adjusted to move its legs in different stepping orders and thereby execute different forms of gait.

A still further object of the invention is to provide a model which includes a portion of the above means for simulating the walking action of a two-legged creature such as a bear, an ape, a duck, an ostrich, etc.

An additional object is to provide in a walking model any of the above types buffer means disposed in the bottom surface of each of the model's legs to facilitate forward movement of the leg over any rough terrain which it might encounter, or to correct and adjust for any unbalance of the model which might occur for a moment.

Other objects and advantages will appear in the following more detailed description of the invention when taken in connection with the accompanying drawings, wherein:

FIG. 3 is an enlargement of the view of the mechanism shown in FIG. 1;

FIG. 4 is a side view of that portion of the mechanism shown in FIG. 1 which effects the lifting action of the legs in simulating the walking action of the animal model;

FIG. 5 is a side view of one form of means for actuating the mechanism by horizontal movement of the feet;

FIG. 6 is an enlarged top view of the same taken on the lines 6—6 of FIG. 5;

FIG. 7 is an end view of the same taken on the lines 7—7 of FIG. 5;

FIG. 8 is a side view of one of the front legs showing details of the buffer means;

FIG. 9 is a side view of another leg at the opposite side of the model;

FIG. 10 is an enlarged side view of the universal joint between the front and rear sections of the mechanism;

FIG. 11 is a view taken in section on the lines 11—11 of FIG. 10;

FIG. 12 is a view taken in section on the lines 12—12 of FIG. 10; and

FIG. 13 is a view taken in section on the lines 13—13 of FIG. 10; and

FIG. 14 is a view taken in section on the lines 14—14 of FIG 10.

Figure 2:
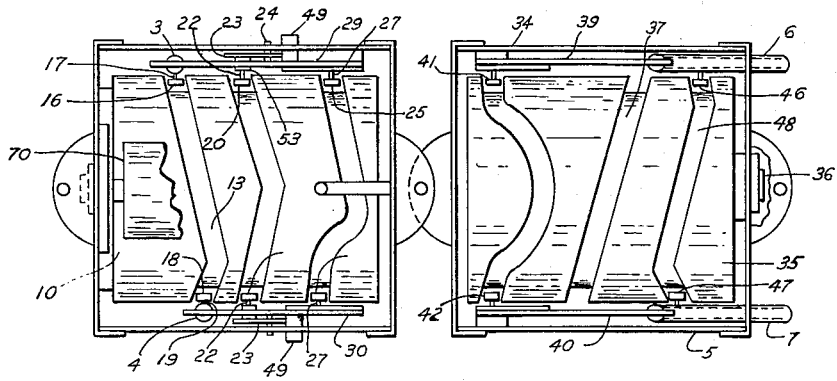
FIG. 2 is an enlarged view in outline taken on the lines II—II.
Figure 1:
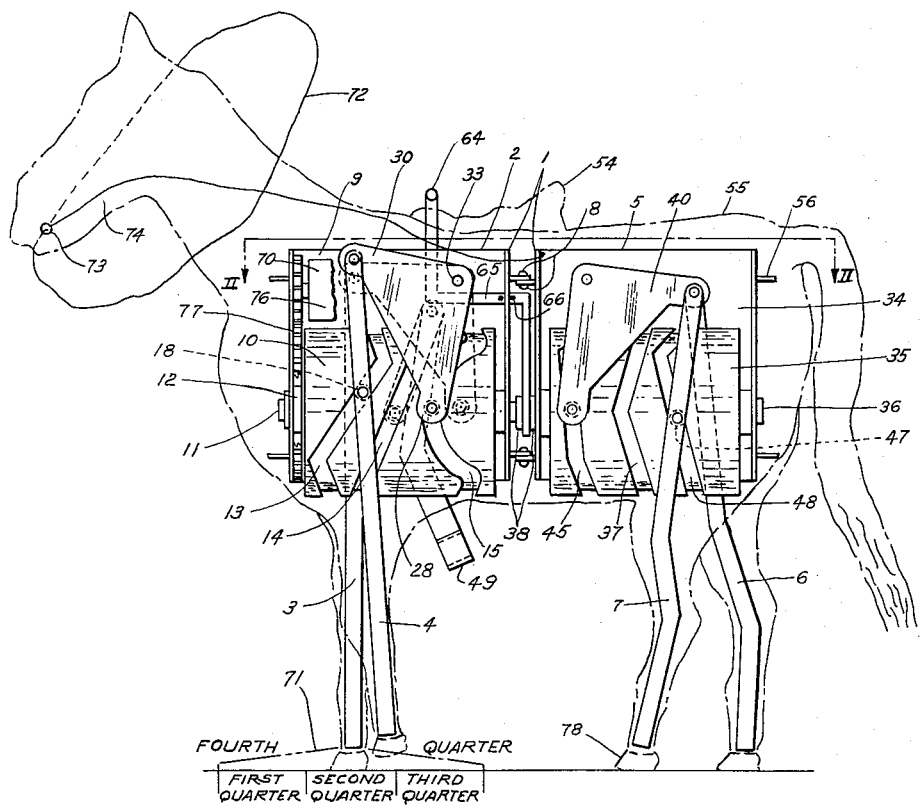
FIG. 1 is a side elevation of the actuating mechanism incorporated in the preferred embodiment of the invention.

As shown in FIGS. 1, 2 and 3, the mechanism 1 of the invention comprises a front section 2 for actuating the front legs 3 and 4 and a rear section 5 for actuating the back legs 6 and 7. As will appear more fully later, these two sections 2 and 5 are substantially identical in structure and are joined in back-to-back relation by swivel connection 8.

The front section 2 comprises a casing 9, in which a drum 10 is rotatably mounted by means of a shaft 11 which extends axially through the drum 10 and is supported front and rear in bearings 12 mounted at each end of casing 9. The drum 10 is encircled, or girdled, by three winding grooves 13, 14 and 15. The front groove 13 serves to actuate the legs 3 and 4 forward and backward in vertical planes parallel to the axis of the drum 10 at one side, when the drum is rotated, by a follower 16 rotatably mounted at an intermediate point on leg 3 by means of a pin 17. At the other side the groove 13 is traversed by a follower 18, when the drum is rotated, the follower being rotatably mounted by means of a pin 19 at an intermediate point on leg 4. The center groove 14 is provided for imparting rotary motion to the drum 10 as it is traversed by a pair of oppositely disposed followers 20 and 21 (FIG. 2) rotatably mounted by means of pins 22 to the lower ends of depending arms 23. As best seen in FIGS. 5 and 6, these arms 23 are rockably mounted by means of pins 24 at their upper ends to the casing 9 at opposite sides of the drum 10. As will hereinafter appear more fully, the followers 20 and 21 are alternately urged against the inclined angle of the groove 14 to effect rotation of the drum 10. As detailed later, the followers 20 and 21 are alternately urged against the inclined angle of the groove 14 by pedal or stirrup action to effect rotation of the drum 10.

The third or inner groove 15 is provided for the purpose of lifting either one of legs 3 and 4 individually as that leg is moved forward in one of the aforesaid vertical planes. This groove 15 also effects lowering of the leg as it is actuated backwards in the same plane relative to the drum 10 and thereby takes part in propelling the model forward. The groove 15 is adapted to be traversed when the drum 10 is rotated, by two followers 25 and 26 mounted at opposite sides of the drum 10 by means of pins 27 to lower arms 28 of bell cranks, or levers, 29 and 30, respectively. These bell cranks, or levers, 29 and 30 (FIG. 5) are formed in a triangular profile, having the arms 28 at the bottom and the upper arms 31 pivotally connected to the tops of the legs 3 and 4, respectively, by means of pins 32. The third corners of the triangularly outlined bell cranks 29 and 30 are likewise at the top, but are pivotally mounted by means of pins 33 to opposite sides of the casing 9.

It will be apparent that as the followers are moved forward and backward in their alternate turns the bell cranks 29 and 30 will be rocked back and forth about the pins 33, thereby alternately lifting and lowering each of the legs 3 and 4 in its turn. As the leg 4 is swung forward by the follower 18 in the groove 13, the leg 4 is lifted at the same time by the clockwise rocking of the bell crank 30 about the pin 33 effected by the follower 26 traversing the groove 15. In the same manner leg 3 is lifted by clockwise rocking of its associated bell crank 29 when the leg 3 is swung forward.

The back section 5 comprises a casing 34, in which a drum 35, corresponding to the drum 10, is rotatably supported on a shaft 36 in the casing 34 in the same manner as the drum 10 is supported on shaft 11 in casing 9, one difference being that the end-to-end direction of the drum 35 is the reverse of drum 10. As previously noted, another difference is that the center driving groove 37 in drum 35 is inoperative, while the corresponding center groove 14 in drum 10 is utilized to effect rotation of the drum and, through the medium of a universal joint 38, the rotation of drum 35 also. The bell cranks 39 and 40 correspond to the bell cranks 29 and 30, but are reversed end-for-end for cooperation with the reversed drum 35. The operation of the followers 41 and 42 in groove 45 effects counterclockwise rotation of bell cranks 39 and 40 to lift legs 6 and 7, respectively, as the legs are moved forward in their individual actions by the actions of followers 46 and 47 in groove 48.

The means for effecting rotation of the drum 10 is best illustrated in FIGS. 5, 6 and 7. A pair of stirrups are integrated with a pair of pendulous levers 50 at their bottoms, which levers are rockably supported at their tops on the pins 24 which also support the arms in the casing 9. Each of the levers 50 is crooked backward at 51 (FIG. 5) and outward at 52 (FIG. 7) for providing better availability of the stirrups 49 to the rider while maintaining the proper bearing relations between the straight upper section of the lever 50 and a roller 53 carried on pin 22 at the bottom of the pendulous arm 23. By pressing the follower 21 forward against the inclined plane of that part of the groove 14 shown in dotted lines in the lower half of drum 10, when positioned as shown in FIG. 2, the drum 10 is rotated counterclockwise as viewed from the front. With the stirrups 49 and followers 20, 21 positioned as shown in FIGS. 1, 2 and 3 the operator will be pushing the left-hand stirrup 49, which pressure will propel the follower 21 the aforesaid dotted line portion of the groove 14 in lower half of drum 10 (FIG. 2). At the same time that portion of groove 14 shown in solid lines in the upper half of drum 10 in FIG. 2 will be driving the follower 20 backward on the right-hand side of the model. Since the levers 50 are not positively connected to the followers 20, 21 the lever 50, with its stirrup 49, will have dropped back to a substantially vertical position. This vertical position will be maintained when the model is being led, as will hereinafter appear more fully. An operator when riding may sit upon a saddle 54 suspended hammock-like on a skin indicated generally in outline at 55. This skin is attached by suitable means (not shown) to a set of four brackets 56 mounted in pairs on the respective casings 9 and 34.

The universal joint 38 shown in detail in FIG. 11 transmits the driving power from the drum 10 (FIGS. 1 and 3) to the drum 35 of section 5 by operatively connecting the shaft 11 to the shaft 36. Each of the shafts 11 and 36 is formed with a hollow-squared cross section into which the universal joint 38 extends. The universal joint 38 comprises a swivel block 57 provided at one end with a relatively short squared portion 58, having rounded corners for establishing a loosely slidable fit in the inner hollow end of the shaft 11. A similar short, squared portion 59 (FIGS. 10, 13 and 14) is provided at the other end of the swivel block 57 for a loosely slidable fit in the inner, hollow end of the shaft 36. From the squared portions 58 and 59 the surface of the swivel block 57 tapers inward toward a reduced cylindrical portion 60 at the middle, which portion is bracketed by a pair of spaced, squared collars 61. A spring 62 is caged in the inner end of the shaft 11 so as to constantly urge the block 57 outward toward the shaft 36 and against a stop 63 (FIG. 14) rigidly mounted on the top side of the inner surafce of the shaft 36. A handle 64 is provided for shitfing the swivel block forward away from the stop 63 to permit the operator to change the phase relation between the two drums 10 and 35, and thereby change the gait or stepping sequence of the model, as will appear more fully later.

This handle 64 extends upward through the skin 55 and in front of the saddle 54 and comprises a Z-shaped extension 65 which is rockable in a suitable opening through the inner wall of the casing 9 where it is confined by a pair of locking pins 66 spanning opposite sides of said opening. The lower end of the extension 65 comprises a fork 67 which straddles the cylindrical portion 60 between the collars 61 on the block 57. An annular undercut in the interior surface of the shaft 36 provides an annular recess 68 (FIG. 13) in which sufficient clearance is provided to permit rotation of the squared portion 59 of block 57 in shaft 36 while the shaft 36 remains stationary. The squared portion 59 is shifted into the recess 68 by pulling back on the handle 64, which action causes the lever 65 and thus the fork 67 to rock clockwise about the pivot point between the pins 66 (FIG. 10). The fork 67 then engages the left-hand collar 67 to shift the block 57 to the left, as viewed in FIGS. 3 and 10, and against the pressure of spring 62 until it is free to rotate in the recess 68.

From the foregoing description of the universal joint 38 and the parts associated therewith it will be apparent that it is possible to change the phase relation between the two drums 10 and 35 by pulling back on the handle 64 until the squared portion 59 is disposed in the recess 68. While holding this position with the handle 64 the shaft 11 may be rotated through 90 degrees either clockwise or counterclockwise from the position shown in FIG. 14 by rotation of the drum 10 through suitable operation of the stirrups 49, as previously described, or by motor means 70, hereinafter described. It will be understood, of course, that opposite or clockwise rotation of the drum 10 may be effected through forward pressing of the left-hand stirrup 49, as viewed from the front. The swivel block 57 is prevented from being rotated 180 degrees out of phase from the position in which it is shown in FIG. 14 by the collision of a pin 69 fixed in the right-hand end of the swivel block 57 with the stop 63, which also limits the inward movement of the block 57. This precaution obviates the possibility of establishing an unbalanced gait which is undesirable.

It should here be understood that the coordination and timing relation between the grooves 13 and 15 in drum 10, and between grooves 43 and 48 in drum 34, is such that the action of lifting a leg and swinging it forward occurs during one-fourth of a complete revolution by its associated drum. Thus each leg is on the ground moving backward relative to the drum, but actually propelling the drum and model forward for three-quarters of the associated drum. When the drums 10 and 35 are disposed in the positions in which they are shown in FIGS. 1, 2 and 3, and indicated in FIG. 14, the cam 18 and attached leg 4 are half-way through that quarter of a complete revolution the drum in which the leg 4 is raised and advanced, the groove 13 controlling the advancing movement of legs 3 and 4 and the groove 15 controlling the lifting movement of the same. In this case the profiles of the grooves 13 and 15 about the drum 10 are such that the stepping actions of legs 3 and 4 are completed during the fourth quarter of a revolution as indicated by a broken line 71, (FIG. 1) and of course are 180 degrees apart in phase relation. It follows, therefore, that three legs will be on the ground while one leg is being raised and advanced if the drums 10 and 35 are 90 degrees out of phase as shown. Since the drums are identical, but disposed in back-to-back relation to each other, it will be seen by reference to FIG. 2 that drum 35 is 90 degrees in advance of drum 10 during rotation in a counterclockwise direction as viewed from the front. Consequently, the leg 7 which carries the follower 42 is the last leg that has completed its fourth quarter of a stepping cycle, and, as can be seen in FIG. 1, is the foremost or earliest leg in the cycle. This relative position of the two drums provides a walking gait.

In the next quarter revolution, or quadrant of the drums, leg 4 will be on the ground in an advanced position, indicated as first quarter in FIG. 1; leg 3 will be in its third quarter, leg 7 will be in second quarter, and leg 6 will be in its fourth, or leg advancing, quarter. In the next quadrant of the drums leg 3 will be in its leg raising and advancing, and leg 7 will be in the position indicated as third quarter in FIG. 1. In the fourth quadrant of the drums leg 7 will be lifted and advanced, after which the cycle just described is repeated.

For purposes of better illustration the shaft 36 has been shown in starting or zero position in FIGS. 10 to 14, inclusive. This position does not correspond to the position shown in FIGS. 1, 2 and 3 in which the legs are half-way through one-quarter of a cycle. Now, if the drum 10, as viewed from the front, is rotated 90 degrees counterclockwise relative to drum 35 in the manner previously described, the pin 69 will be disposed on the left-hand side of shaft 36 as viewed in FIG. 14 and drums 10 and 35 will be line in line, or in phase. In this phase relation of the drums counterclockwise movement will cause legs 3 and 6 to advance at the same time in the first quarter, in the second quarter all four legs will be on the ground, in the third quarter legs 4 and 7 will execute a stepping action, and in the fourth quarter all four legs will again be on the ground with the lateral positions reversed. Thus, the legs are actuated in simulation of a pacing gait.

If the drum 10 as viewed from the front is rotated 90 degrees, the pin 69 will be disposed on the right-hand side of the shaft 36 as viewed in FIG. 14. In this position of pin 69 the drums 10 and 35 will be 180 degrees out of phase. As viewed in FIG. 1, the arcuate portion of groove 15 will be on the back or opposite side from that shown. Counterclockwise rotation of drums 10 and 35 will cause leg 6 to first be lifted and advanced in a stepping action in the first quadrant of rotation, leg 4 to next be advanced in the second quadrant, leg 7 in the third quadrant, and leg 3 in the fourth quadrant. This action simulates the gait of a trot when executed rapidly.

During operation in any gait or phase relation of the drums 10 and 35, the model may be manipulated to the right or left by pulling on the corresponding side of the continuous line or rein 72. This rein 72 is passed through a loop 73 at each side of a head 74 of the model, where a bridle bit would normally be, and then anchored to a loop 75 at each upper, forward corner of the casing 34. Thus, pulling on the left-hand side of the rein 72 will draw the casings 9 and 34 closer on the left-hand side and will turn the model in that direction regardless of whether the model is being led or ridden. The model may be backed up by reversing the pedal action on the stirrups 49, or by reversing the motor means 70, or pushed back manually and guided with the rein 72 as described before.

The motor means 70 comprises an electric motor 76 mounted by suitable means (not shown) inside the casing 9 and above the drum 10, and connected by a gear train 77 to the front of shaft 11. This motor 76 may be energized from a suitable source of electricity extraneous to the model. Pushing or pulling the model manually will also actuate the drum 10, which action will be transmitted to the drum 35 by the universal joint 38 in the usual manner.

Attention is now directed to FIGS. 8 and 9, in which the details of the lower extremities of the model embodying this invention are shown. The legs 3 and 4 shown in FIGS. 9 and 8, respectively, exemplify the details of legs 7 and 8, so the latter details will not be discussed. At their bottoms the legs 3 and 4 terminate in hoofs 78 which are rigidly attached to the legs. These hoofs are preferably rounded in the form of a portion of a sphere struck on a radius approximately equal to the length of the legs. Suspended in suitable cavities 79 in the bottoms of the respective hoofs 78 are rollers 80 adapted to roll about transverse axes extending through pins 81 upon which the rollers are at one time suspended. Each pin 81 is arranged to ride in a pair of inward opening grooves 82 formed in the side walls of the cavity 79 so as to slope upwardly toward the front. These grooves 82 are located so as to parallel each other transversely and are curved slightly away from the bottom of the hoof at both front and back. By reason of these curvatures each roller 80, when its respective leg is raised to be actuated forward, rides downward to the lower ends of the grooves 82 which parallel the bottom of the hoof 78 at a distance which causes the lower portion of the roller 80 to extend below the bottom of the hoof as shown in FIG. 8. The roller 80 is stabilized in this position by the tilting of the advancing leg so that the roller 80 will support its leg during this advancing movement and aid in the continuance of the movement of the model, as seen in FIG. 9. After the hoof 78 has returned to the ground the roller 78 will be forced upward in the grooves 82 by the ensuing backward thrust of the leg, so that the roller will not interfere with the propelling action of the leg.

It will also be seen by reference to FIG. 8 that, when a front leg 3 or 4 is relaitvely shortened by its raising action, the skin 55 thereon will buckle forward in simulation of knee bending action. Conversely, on the back legs 6 and 7 the skin will buckle backward when either of the back legs is raised.

It will be apparent also that a two-legged creature could be propelled in a walking action by section 2 alone, preferably powered by motor means 70.

Having now described my invention, what I claim as new and desire to secure by Letters Patent, is:

1. In an ambulant model of a four-legged walking animal, the combination of, a pair of casings pivotally connected in end-to-end relation and supporting the external semblance of the animal, a pair of front legs operatively connected to one of the casings and a pair of back legs operatively connected to the other casing for supporting and propelling the model in simulation of the animal's walk, lever means establishing the operative connections by pivotally connecting the individual leg to its respective side of each casing, a cylindrical cam drum rotatably mounted in each of said casings, cam follower means associated with each drum operable by said drum to produce leg lifting and advancing action in first one leg and then the other of each pair at half-revolution intervals from each other, said cam follower means being otherwise operative to propel each leg backward and the model forward when not producing leg advancing action, and means for actuating both of said drums in timed relation to each other.

2. In an ambulant model of a malking animal, the combination of a pair of casings supporting the external semblance of such animal, a pair of legs supporting each casing and operable to propel same in simulation of said animal's walk, lever means pivotally mounted to each side of each casing and operatively connected to the legs individually, one cam means connected to said legs operable to rock the legs forward and backward individaully, said one cam means comprising a drum means rotatably mounted in said casing providing a winding groove and follower means attached to each leg operable by traversing said groove to rock each leg forward during one part of the rotation of said drum means and backward during another part of one revolution of said drum means, another cam means connected to said lever means and operable to cause said lever means to first lift and then lower each leg as it is rocked forward and to maintain said leg in its lowered position as it is rocked backward and power means operative to actuate both cam means together.

3. In an ambulant model of a walking animal, the combination of a pair of casings supporting the external semblance of such animal, a pair of legs supporting each of said casings and operable to propel same in simulation of said animal's walk, lever means pivotally mounted to each side of each casing and operatively connected to the legs individually, cam means connected to each of said legs operable to rock the legs forward and back individaully, said cam means comprising one drum means rotatably mounted in each casing providing one winding groove and follower means attached to each leg operable by traversing said groove to rock each leg forward during one part of the rotation of the respective drum means and backward during the remaining part of one revolution of the respective drum means, another winding groove and follower means connected to said elver means and operable in cooperation with the respective drum means to cause said lever means to first lift and then lower each leg as it is rocked forward and to maintain the same leg in its lowered position as it is rocked backward.

4. In an ambulant model of a walking animal, the combination of a pair of casings pivotally connected in end-to-end relation a pair of front legs operably associated with one casing and a pair of back legs operably associated with the other casing a rotary cam means for effecting the walking action of the associated pair of legs, a hollow, squared shaft positively connected to and supporting each cam means in its particular casing and extending through the inner end of each casing, power means operatively connected to one of said shafts for driving same, and a universal joint means comprising a swivel block slidably interlocked with the squared opening in the inner end of each shaft.

5. In an ambulant model of a walking animal, a pair of casings connected in end-to-end relation, a pair of front legs operably associated with one casing and a pair of back legs operably associated with the other casing, a rotary cam means operable to actuate the associated pair of legs in a walking action, a hollow, squared shaft positively connected to and supporting each cam means in its particular casing and extending through the inner end of each casing, power means operatively connected to one of said shafts, coupling means comprising a block slidably interlocked with the squared opening in the inner end of each shaft and slidable therein to a position in which said shafts are disengaged, and means manually operable to disengage said swivel block from one of said shafts to permit changing the phase relation between the two cam means and operable to reengage said one shaft in a different phase relation to establish a different stepping sequence of the legs.

6. In an ambulant model of a four-legged walking animal, a driving mechanism for actuating the legs in simulation of the animal's walk, said mechanism comprising a piar of casings, means pivotally connecting said casing in end-to-end relation for obtaining horizontal articulation relative to each other, means for effecting said articulation, a cylindrical cam drum rotatably mounted in each of said casings in longitudinal relation thereto, a walking lever rockably mounted between its ends to each side of each casing, a leg pivotally mounted at its upper end to one end of each walking lever, one cam means operatively connecting each drum to an intermediate point on each leg for swinging each leg forward and backward in a vertical plane parallel to the lengthwise axis of said model during a stepping action of that leg, another cam means operatively connecting each drum to the inner ends of its associated walking levers in timed relation to the swinging movement of the leg so as to raise each leg as it is swung forward, and keep each leg lowered as it is swung back, buffer means carried in the bottom of each leg operable by movement of the leg to be extended down from the leg when the leg is actuated forward and to be contained within said leg when the leg is actuated backward relative to the casing, coupling means interposed between said drums in a particular one of several rotative relations between each other, means manually operable to actuate the coupling means to connect and disconnect said drums in different rotative relations, and power means connected to one of said drums for actuating both of said drums.

7. In an ambulant model of a four-legged walking animal, the combination of a pair of casings pivotally connected in end-to-end relation and supporting the external semblance of the animal, two pairs of legs, each pair having operative connections with each of the respective casings for supporting and propelling the model by simulation of the animal's walk, lever means establishing said operative connections by pivotally connecting the individual leg to each side of each casing, one cam means connected to each of said legs for rocking each leg forward and back individually in a vertical plane parallel to the direction of travel of the model, another cam means connected to said lever means for lifting each leg individually as the leg is rocked forward and keeping each leg lowered as the leg is brought back relative to the model, and power means for actuating said cam means comprising drum means having a winding groove formed in the periphery thereof, a follower for traversing said groove, and physically operable means for transferring the force exerted on said follower against the inclined plane presented by said winding groove and utilizing one component of such force to effect rotation of said cam means.

8. In an ambulant model of a four-legged walking animal comprising a pair of casings pivotally connected together for articulation, means for effecting said articulation, a pair of front legs operatively connected with one casing and a pair of rear legs operatively connected with the other casing, lever means operatively connecting each pair of legs to its associated casing, one cam means connected to each of said legs for rocking each leg forward and back individually, another cam means connected to said lever means operable to lift and lower each leg individually as the leg is rocked forward and to keep each leg lowered as the leg is brought back relative to the model, power means for actuating both of said cam means in timed relation to each other, said power means including a universal joint operatively coupling the two casings and capable of being disconnected for changing the timing relation between the two cam means, and buffer means carried in the bottom of each leg capable of being extended during the forward swing of each leg and being contracted when said leg is swung backward.

9. In an ambulant model of a walking animal, the combination of a pair of casings supporting the external semblance of said animal, a pair of legs operatively connected to each casing for supporting and propelling same in simulation of the animal's walk, lever means pivotally mounted on each side of each casing and pivotally connected at one end to the upper ends of the individual legs, one cam means connected to intermediate points on the legs operable to rock said legs individually forward and backward, another cam means connected to said lever means operable to cause said lever means to lift each leg as it is rocked forward and to keep each leg lowered as it is rocked backward relative to said casing, power means operative to actuate both cam means together, and buffer means included in the lower surface of each leg for stabilizing the model during forward movement of that leg, said buffer means comprising a hoof having a cavity in the bottom surface thereof with a pair of curved, transversely parallel grooves formed in the lateral walls of said cavity, a curved body rotatably and slidably carried in said grooves, and said grooves being turned upward toward the front of the hoof whereby said body is disposed entirely within said cavity during backward thrust of the associated leg and is extended part way out of said cavity below the bottom surface of said hoof when said leg is being advanced in a stepping action.

10. In an ambulant model of a four-legged walking animal, the combination comprising a pair of casings, a pair of front legs and a pair of back legs operably associated with the respective casings, actuating means operatively associated with each pair of legs for effecting the walking action of said legs by raising each leg as it is swung forward and keeping each leg lowered as it is swung back, and buffer means carried in the bottom of each leg by movement of the associated leg adapted to be extended down from the leg when the leg is actuating forward and to be contained within said leg when the leg is actuated backward relative to the casing, said buffer means comprising a hoof having a cavity in the bottom surface thereof with transversely parallel, longitudinal recesses formed in the lateral walls of said cavity, said recesses being curved upward toward the front of the hoof, and a curved body rotatably and slidably carried in said grooves.

11. In an ambulant model of a walking animal, a pair of casings connected in end-to-end relation, a rotary driving element mounted axially in each of said casings, a hollow squared shaft positively connected to and supporting each rotary element in its respective casing, power means operatively connected to one of said shafts, and coupling means comprising a block interlocked with the squared openings in the adjacent ends of said shafts and slidable therein to a position in which said shafts are disengaged, means manually operable to disengage said swivel block from one of said shafts to permit changing the phase relation between said shafts, and means for returning said block to the position of interlocking relation between said shafts.

12. In an ambulant model of a four-legged walking animal, the combination of a pair of casings pivotally connected in end-to-end relation to provide horizontal articulation between the casings, a pair of front legs operably mounted in the other of said casings, a lever means pivotally connecting each leg to its proximate side of the casing, a cam drum rotatably mounted in each casing, one individual cam follower means connected to each of said legs for rocking each leg forward and back in a vertical plane, another individual cam follower means connected to each of said lever means for lifting each leg individually as the leg is rocked forward and keeping each leg lowered as the leg is brought back relative to the model, universal joint means interconnecting the two cam drums to maintain the driving connection between the two drums when the casings are articulated, and steering means manually operable to draw the adjacent corners of the casings at a selected side closer together to thereby change the course of travel of the model toward the selected side.

13. In an ambulant model of a four-legged walking animal, the combination of a pair of casings pivotally connected in end-to-end relation to each other, a pair of front legs operably associated with one casing and a pair of back legs operably associated with the other casing, a lever means pivotally connecting each leg to its proximate side of the casing, a cam drum rotatably mounted in each casing, one individual cam follower means connected to each of said legs for rocking each leg forward and back in a vertical plane, another individual cam follower means connected to each of said lever means for lifting each leg individually as each leg is rocked forward and keeping each leg lowered as the leg is brought back relative to the model, and universal joint means interconnecting said shafts in a flexible coupling capable of adjusting to pivotal action between the two casings.

14. In an ambulant model of a four-legged walking animal, the combination comprising a pair of casings, a pair of front legs and a pair of rear legs operatively associated with the respective casings, a cam drum rotatably mounted in each of said casings, cam follower means associated with each drum operable by said drum to prduce leg stepping action in first one leg and then the other of each pair at half-revolution intervals from each other, and power means for actuating both of said drums, said power means comprising a separate pair of cam follower means disposed at opposite sides of the casing adapted to follow a separate winding groove in one of the drums, and pendulous lever means pivotally mounted to opposite sides of said casing and adapted to abut the last mentioned cam follower means and urge the same against the inclined surface of said winding groove to effect rotation of said drum.

References Cited in the file of this patent

UNITED STATES PATENTS

| | | |
|---|---|---|
| 2,120,102 | Kurelic | June 7, 1938 |

FOREIGN PATENTS

| | | |
|---|---|---|
| 641,815 | France | Apr. 23, 1928 |
| 402,481 | Germany | Sept. 17, 1924 |
| 13,352 | Sweden | Nov. 16, 1901 |